Figure 13:
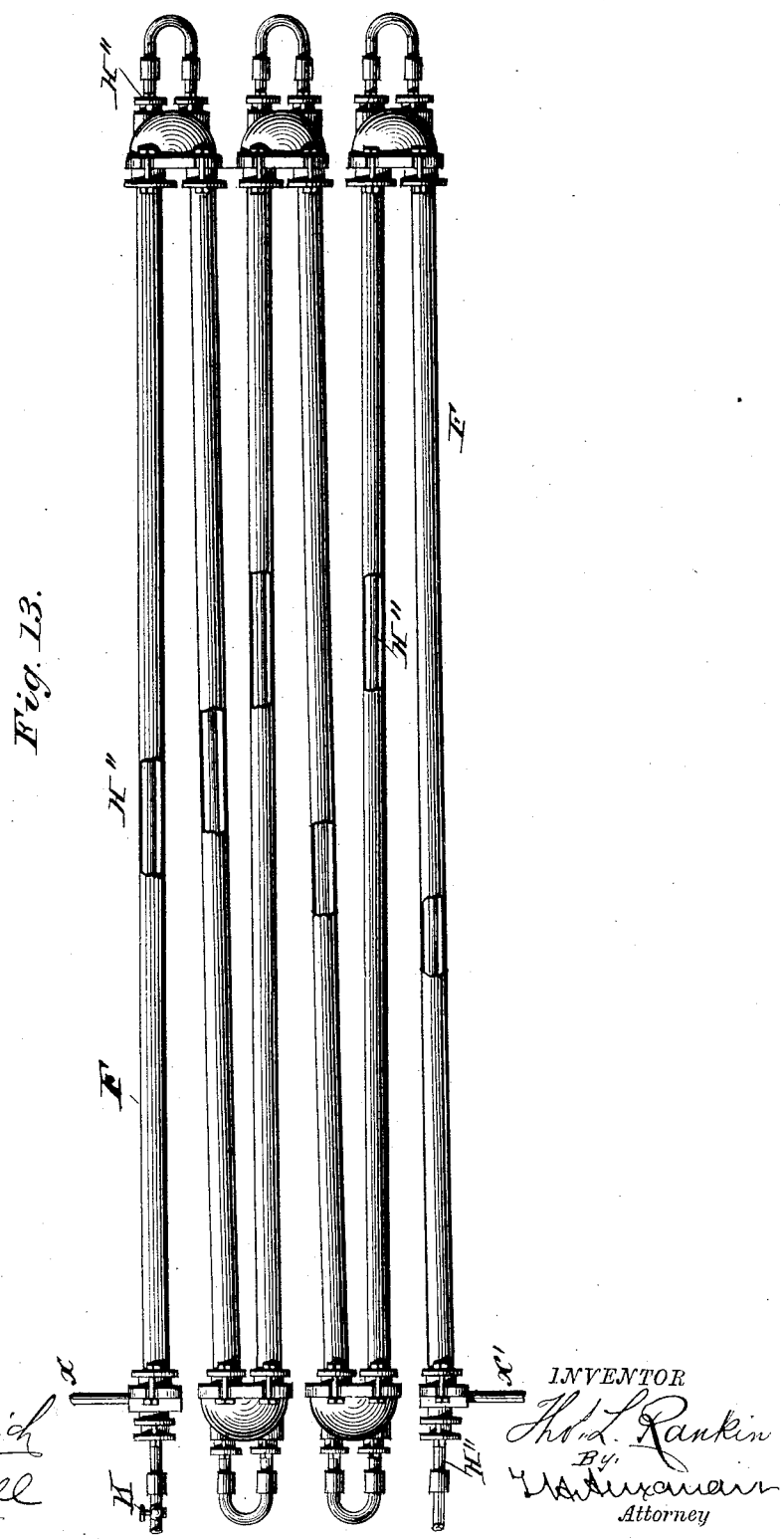

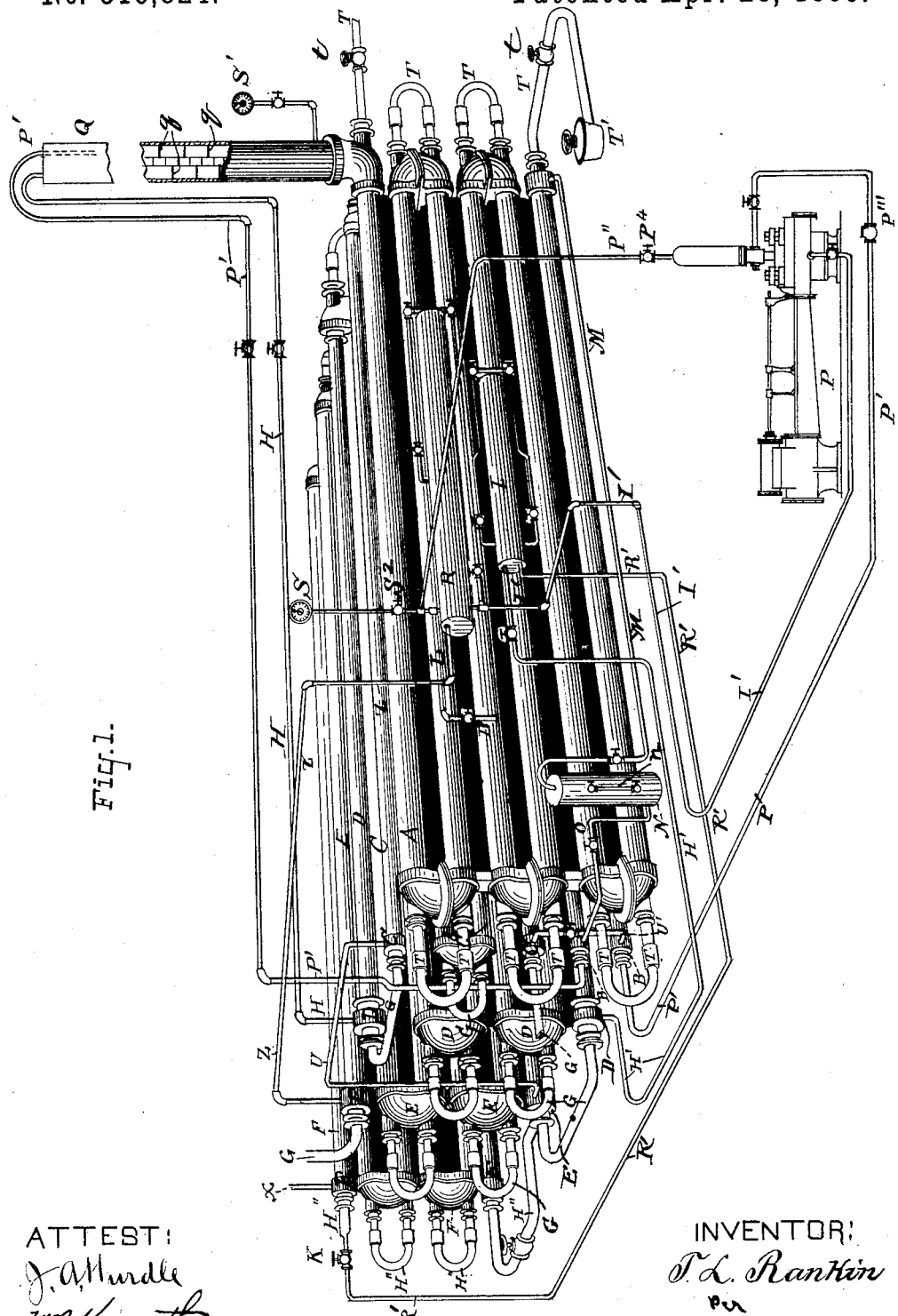

(No Model.) 6 Sheets—Sheet 2.
T. L. RANKIN.
ICE MACHINE.
No. 316,824. Patented Apr. 28, 1885.
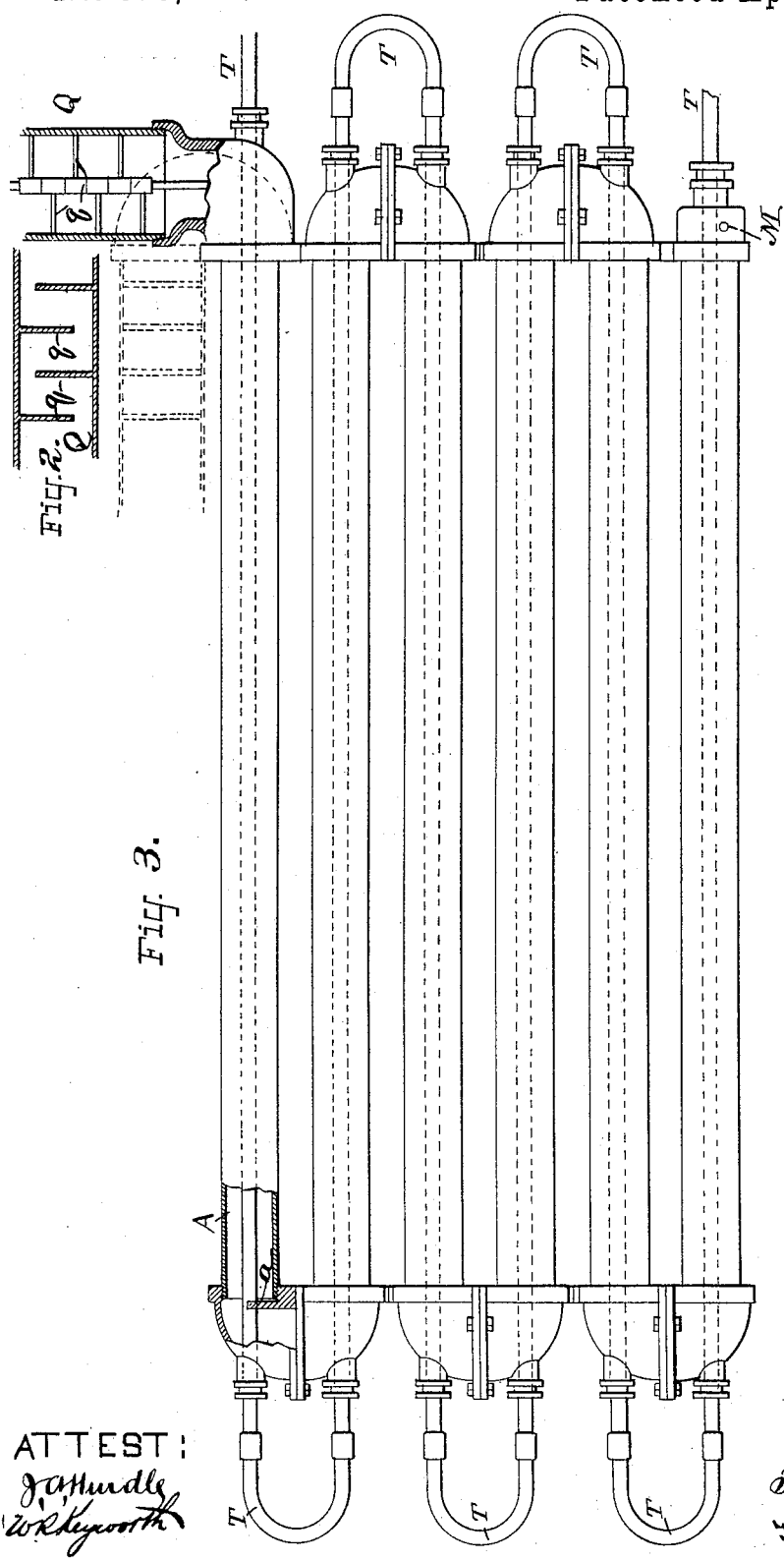
ATTEST:
J. A. Hurdle
W. R. Keyworth
INVENTOR:
T. L. Rankin.
per
T. S. Alexander atty (No Model.)
T. L. RANKIN.
ICE MACHINE.
No. 316,824. Patented Apr. 28, 1885.
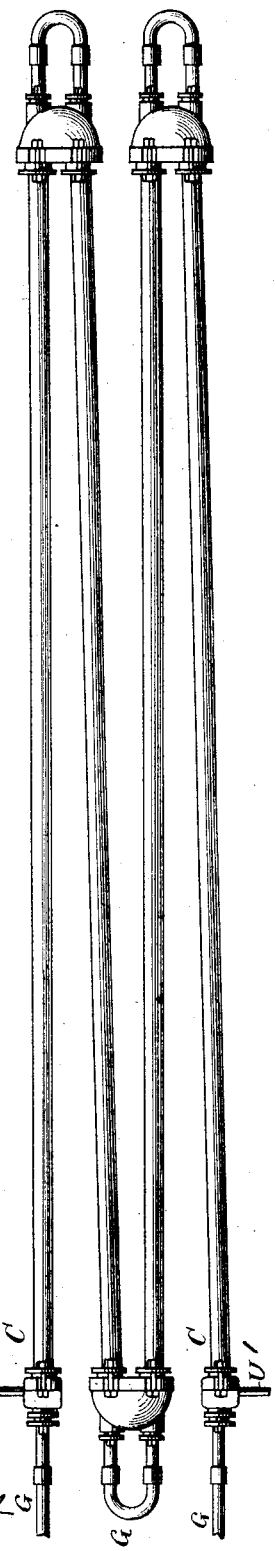
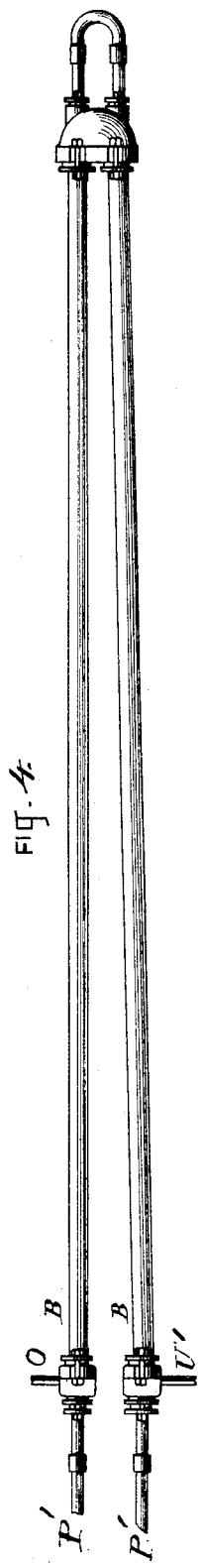
ATTEST:
J. A. Hurdle
W. R. Keyworth
INVENTOR:
T. L. Rankin
per Jas. Alexander
atty

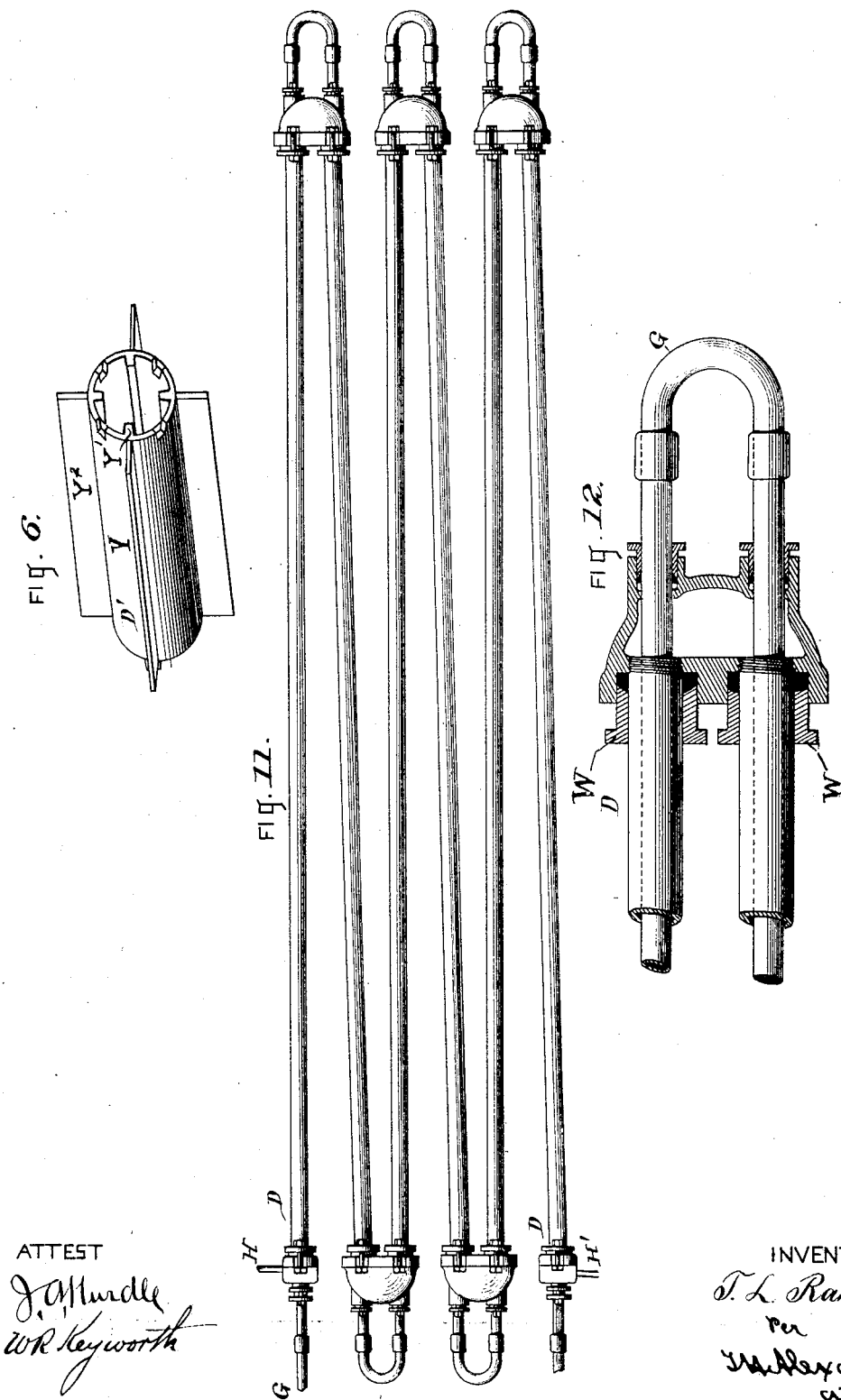

(No Model.) 6 Sheets—Sheet 5.
T. L. RANKIN.
ICE MACHINE.
No. 316,824. Patented Apr. 28, 1885.
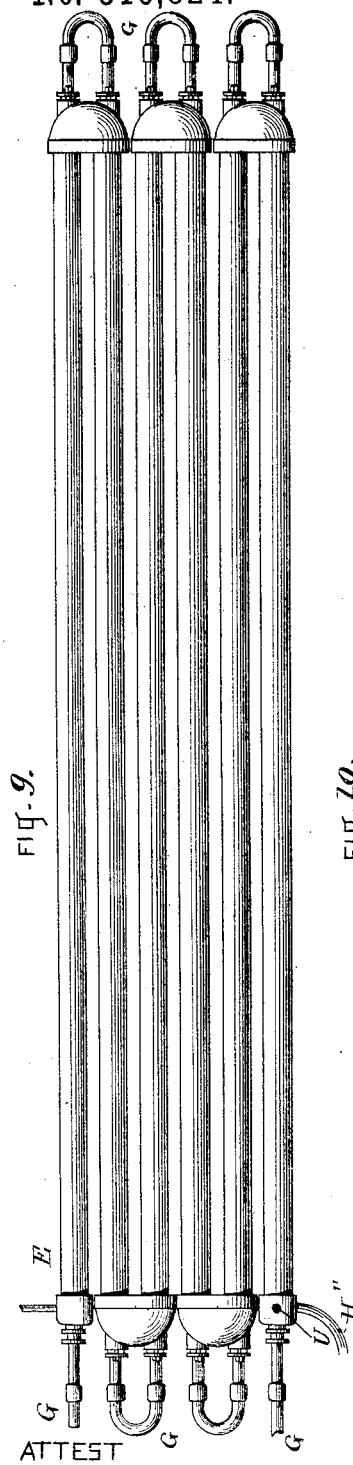
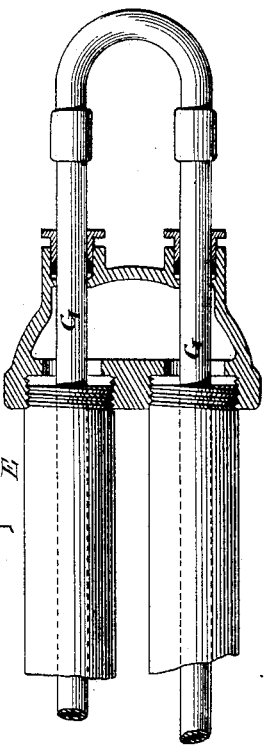
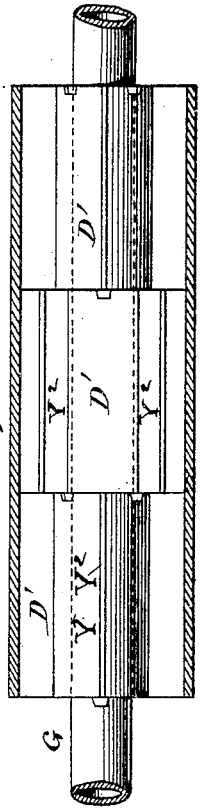
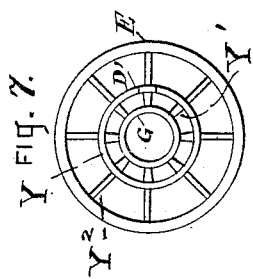
ATTEST
INVENTOR
T. L. Rankin (No Model.)

6 Sheets—Sheet 6.

T. L. RANKIN.
ICE MACHINE.

No. 316,824. Patented Apr. 28, 1885.

WITNESSES

INVENTOR
Thos. L. Rankin
By
Attorney

UNITED STATES PATENT OFFICE.

THOMAS L. RANKIN, OF NEW YORK, N. Y., ASSIGNOR TO JACOB W. SKINKLE, OF CHICAGO, ILLINOIS.

ICE-MACHINE.

SPECIFICATION forming part of Letters Patent No. 316,824, dated April 28, 1885.

Application filed March 21, 1883. (No model.)

*To all whom it may concern:*

Be it known that I, THOMAS L. RANKIN, of New York, in the county and State of New York, have invented certain new and useful Improvements in Apparatus for Making Ice; and I do hereby declare that the following is a full, clear, and exact description thereof, reference being had to the accompanying drawings, and to the letters of reference marked thereon, which form part of this specification.

The invention relates to improvements in apparatus for various refrigerating or cooling purposes, but is principally adapted for ice-making.

The apparatus comprises the usual parts—such as a still, condenser, receiver, refrigerator, and absorber—the invention consisting in the construction and novel arrangement of some of said parts, and in combining with the apparatus a peculiar device for partially heating the water, rich in aqua-ammonia, on its way from the absorber to the still, as hereinafter described.

In the drawings, Figure 1 is a perspective view of the whole apparatus from the side on which the still is situated. Fig. 2 is a sectional view of a part of a horizontal feed-pipe for the still. Fig. 3 is a side view of the still, partly in section, to show its interior construction and having a vertical feed-pipe attached. Fig. 4 is a side view of the equalizer or device to heat the strong aqua-ammonia returning from the absorber to the still. Fig. 5 is a side view of a coil between the equilizer and condenser, in which coil the exhausted water is cooled. Fig. 6 is a perspective view of a section of a conducting device for insertion in the coils, hereinafter named. Fig. 7 is an end view of the same. Fig. 8 is a side view of three sections of said device in a pipe of a coil. Fig. 9 is a side view of the absorber. Fig. 10 is a side view of a part of one end of the absorber, showing the couplings of the interior and exterior pipes. Fig. 11 is a side view of the condenser. Fig. 12 is a side view of a part of one end of the condenser, showing the couplings of the interior and exterior pipes and the packing-boxes at the ends of the latter, and Fig. 13 is a side view of the refrigerator.

The still, equalizer, coil between the equalizer and condenser, condenser, absorber, and refrigerator are all in the form of what are called "return-bend coils," the pipes of which are coupled at alternate ends by any suitable coupling-joints, which form no part of the invention. The coupling-joints shown in the drawings are, however, preferred.

For the sake of clearness, the circulation of the aqua-ammonia, ammoniacal gas, and steam will be first described as they are shown in Fig. 1. Afterward the construction of such parts as differ from the ordinary construction will be described.

Referring to the accompanying drawings by letter, A represents a still in the form of a return-bend coil, the pipes thereof being connected at their ends by proper couplings, as shown.

Q is a vertical pipe for feeding the aqua-ammonia to the still, and for the escape of gas therefrom, provided with the gage S', for ascertaining the pressure of the inflow of water. At the end of each pipe of the still are partial partitions, $a$, Fig. 2, rising from the coupling-joints and intended to keep the pipe about half-full of aqua-ammonia, the overflow of which from said partitions descends into the next pipe below, filling it likewise about half-full of the medium.

T T is a return-bend steam-coil taking steam from any proper source at its upper end, running centrally through the pipes of the still, and having its lower end banked against a proper steam-trap, T', as shown. The pipes of the steam-coil are connected at their alternate ends by proper coupling-joints, and the coil itself is provided with valves $t\ t$, to stop or regulate the flow of steam in the ordinary well-known manner. The aqua-ammonia, after passing through the still and having its gas driven off by the steam-coil, passes out of the front end of the lowest pipe of the still through the tube M into the exhausted-water receiver N, which is an air-chamber, and is provided with the gage-glass $n$ to ascertain the pressure within. The chamber N regulates the flow of exhausted water from itself through the pipe O to the upper pipe of the two-pipe return-bend coil B, Figs. 1 and 4. The pipes of the said coil surround a return-coil of the pipe P', hereinafter described, which conveys the enriched water from the absorber, and after passing it through the coil B, returns it to the feed-pipe Q and thence to the still. The exhausted water, after passing through the coil B in the opposite direction to the enriched water in the pipe P', and heating the latter water, and being itself cooled thereby, leaves the lower pipe of the coil B, and passes through the vertical tube U' to the lowest pipe of a return-bend coil, C, which is a four-pipe coil, as shown in Figs. 5 and 1. The coil C surrounds a portion of the triplicate return-bend coil G G, &c., through the absorber E and condenser D, and has passing through it a current of cold water from its upper end, where it enters the upper pipe of the absorber, to its lower end, where it passes out of the lower pipe of the coil C, the current of cold water being in the reverse direction to the current of exhausted water in the latter coil. The exhausted water passes out of the upper or highest pipe of the coil C through the tube U, and enters the lowest pipe of the return-bend absorber-coil E, Figs. 1 and 9, where it meets with and absorbs the expanded gas from the refrigerator F, which gas enters the absorber by the lower end of the tube H" H", the said tube entering the lowest pipe opposite the entrance of the pipe U. The water thus enriched with gas flows up through the absorber-coils E in an opposite direction to the current of cold water through the coil G, and passes out of the highest pipe of the absorber-coil through the tube Z, whence it flows into the horizontal receiver R, for enriched water, and is drawn thence through the pipe I' by the action of the pump P, which forces it through the pipe P' back to the feed-pipe Q and still. Between the pump and feed-pipe it passes through the equalizer-coil B, being heated by the exhaust-water therein, recently from the still, and reduces the temperature of the same. The chamber R is essentially an air-chamber, and is provided with the pressure-gage S and the pipe L, running from the tube of said gage, and having a valve, L', by means of which the water is drawn off when the pressure is too great.

P''' is a valve on the tube P' to prevent the return of the water to the still, and P'' is a tube provided with a valve P¹ and connecting the air-chamber of the pump with the tube of the gage S, below the valve S² of the same. By closing the valves P''' and S², and opening the valves P¹ and L', the circulation can be confined to the pump till enough water is run off to properly reduce the pressure in the receiver R. The valves L' and P¹ are then closed, and the valves P''' and S² opened, and the circulation of water through the apparatus resumed.

The foregoing closes the description of the circulation of water.

The following is a description of the circulation of gas: The gas, released from the still, rises in the pipe Q and passes thence through the pipe H to the highest pipe of the return-bend condenser-coil D, down which it passes in a direction opposite to the cold water flowing through the return-bend coil G, a portion of which passes centrally through the pipes of the condenser. The gas leaves the lowest pipe of the condenser D, passes through the tube H', and enters the receiver I, where it accumulates under great pressure. It passes from the receiver I through the tube R' to the valve K, being under pressure up to the valve. When the valve K is opened, the gas enters the upper end of the return-bend coil H" and passes downward and expands therein, cooling the brine or other refrigerating medium, which passes upward in the reverse direction through the return-bend refrigerating-coil F, the pipes of which surround the pipes of the coil H". The brine enters the lowest pipe of the coil F through the pipe x' from any proper source and leaves the highest pipe of the same through the pipe x to go to the refrigeration tanks or other proper points. The lower end of the coil H" passes out of the lowest pipe of the coil F and runs to the lowest pipe of the absorber-coil E, into which the expanded gas enters by said lower end, and is absorbed by the exhausted water it meets there, as described. It then forms part of the enriched water, the course of which has been heretofore described. The feed-pipe Q is provided with the alternate partial partitions g g, so as to make the inflowing water move in undulations as it enters the still, and cause the outflowing steam formed in the still to pass through said water and be condensed thereby. This steam-condensing apparatus adapts the apparatus to be placed in the holds of vessels, or in rooms or cellars with low ceilings, which is not practicable with the usual construction. The ends of the pipes forming the condenser-coil D, where they pass into their coupling-pieces, are provided with the interior stuffing-boxes, W, to render their joints tighter. The pipes of the coils T, G, and H all pass through stuffing-boxes of the usual construction as they pass out of their respective exterior coils. The condenser-coil D, absorber-coil E, and refrigerator-coil F have each inserted into them and surrounding their interior coils, G G and H, respectively, the cast-iron condenser sections D, as shown in Figs. 6, 7, and 8. The said sections are each provided with a hollow cylindrical body, Y, the internal radial flanges, Y', to rest on the outer surface of the inner coil, and the external radial flanges, Y², to rest on the internal surface of the outer coil. By means of these condenser-sections the processes in the refrigerator, absorber, and condenser are more rapidly and efficiently performed.

Having thus described my invention, what I desire to secure by Letters Patent is—

1. In an apparatus for ice-making or refrigerating purposes, the combination, with the still thereof, of a feeding-tube provided on its interior with partial partitions so arranged as to cause the steam produced in the still to pass through the incoming feed-water and be condensed thereby, substantially as specified.

2. In an apparatus for refrigerating purposes, the combination, with the still A, provided with the partial end partitions, a a, of a feed-pipe, Q, provided with the alternate partial partitions g g, and receiving the enriched water from the absorber and delivering the gas from the still to the condenser through proper connecting-pipes, substantially as specified.

3. In an apparatus for refrigerating purposes, the combination, with an exterior coil having a medium flowing through it in one direction, and an interior coil having another medium flowing through it at a different temperature in an opposite direction, of conductors suitably formed to be inserted into the exterior coil and to rest on the interior coil, and thus hasten the equalizing of the temperatures of the two mediums, substantially as specified.

4. The combination, with the return-bend coils D and G, of the conductor-sections D, having hollow cylindrical bodies Y, and provided with the radial flanges Y' Y², substantially as specified.

5. In an apparatus for refrigerating purposes, a device to heat the enriched water returning from the absorber to the still by the exhausted water flowing from the still, which device is composed of the return-bend coil B, through which the exhausted water flows in one direction from the still, and the pipe P', passing through the coil B, and having the enriched water passing through it to the still in the opposite direction, substantially as specified.

6. In an apparatus for refrigerating purposes, the combination, with the still A, pipe M, and regulating air-chamber N, provided with the glass gage-tube n, of the delivery-tube O, carrying the exhausted water to the equalizer-coil B under pressure from the air-chamber, substantially as specified.

7. The combination, with the pump P, having connected the incoming-tube I', and outgoing tube P', provided with the valve P''', of the receiver R, provided with the gage S, having the valve S², the tube L, having the valve L', and the connecting-tube P'', having the valve P⁴, substantially as specified.

In testimony that I claim the foregoing as my own I affix my signature in presence of two witnesses.

THOS. L. RANKIN.

Witnesses:
W. R. KEYWORTH,
A. E. DOWELL.